United States Patent [19]

Steinhart

[11] 4,368,662
[45] Jan. 18, 1983

[54] CYLINDER ARRANGEMENT FOR FRICTION-WELDING MACHINE

[75] Inventor: Wilhelm Steinhart, Friedberg, Fed. Rep. of Germany

[73] Assignee: Industrie-Werke Karlsruhe Augsburg Aktiengesellschaft Zweignieder-Lassung Keller & Knappich, Augsburg, Fed. Rep. of Germany

[21] Appl. No.: 128,050

[22] Filed: Mar. 7, 1980

[30] Foreign Application Priority Data

Mar. 9, 1979 [DE] Fed. Rep. of Germany ....... 2909267

[51] Int. Cl.³ .............................................. F01B 7/20
[52] U.S. Cl. .......................................... 92/52; 92/59; 92/61; 228/49 A
[58] Field of Search ................. 92/61, 66, 51, 52, 6 R, 92/59, 128; 91/167 R, 173; 228/48, 49 A, 2

[56] References Cited

U.S. PATENT DOCUMENTS

| | | | |
|---|---|---|---|
| 2,146,346 | 2/1939 | Nelson | 92/59 |
| 2,173,358 | 9/1939 | Ernst | 91/173 |
| 2,293,393 | 8/1942 | Humphrey | 91/173 |
| 2,568,228 | 9/1951 | Forse | 92/51 |
| 2,794,633 | 6/1957 | Delany | 92/52 |
| 2,934,380 | 4/1960 | Julier | 91/167 R |
| 2,969,042 | 1/1961 | Litz | 91/167 R |
| 3,738,227 | 6/1973 | Bitzer | 91/167 R |
| 3,862,664 | 1/1975 | Skelly | 91/173 |
| 3,896,985 | 7/1975 | Kiwalle | 228/2 |
| 3,904,416 | 9/1975 | Onoda | 91/167 R |
| 4,030,658 | 6/1977 | Parrish | 228/2 |
| 4,093,501 | 6/1978 | Van Staveren | 228/2 |

Primary Examiner—Abraham Hershkovitz
Attorney, Agent, or Firm—Karl F. Ross

[57] ABSTRACT

A friction-welding machine of the type in which a cylinder arrangement applies pressure to urge two workpieces together upon the rotation of one of the workpieces against the other to prepare the interface for bonding. The cylinder arrangement which applies the welding pressure comprises a main cylinder whose piston acts upon the workpiece through a head formed with an auxiliary cylinder and piston arrangement greatly increasing the working range of the cylinder arrangement.

3 Claims, 3 Drawing Figures

R — FRICTION WELDER

CYLINDER ARRANGEMENT FOR FRICTION-WELDING MACHINE

FIELD OF THE INVENTION

My present invention relates to a friction-welding machine for the welding of two workpieces together and, more particularly, to a welding machine in which one workpiece is rotated rapidly against a stationary workpiece to prepare the interface for bonding and the bonding pressure is applied by a fluid-operated cylinder arrangement.

BACKGROUND OF THE INVENTION

A friction-welding machine generally comprises two clamping devices in which respective workpieces are fixed and so juxtaposed that the workpieces lie in contact with one another along an interface at which a friction weld is to be formed.

One of the clamping devices and hence one of the workpieces is rotated rapidly against the other workpiece, which can be stationary, and the pressure of the cylinder arrangement is applied transversely to the interface.

Friction welding is an economical and convenient way of welding two workpieces together with a high-quality precision bond and is used when at least one side of the weld cross section is to be rotationally symmetrical.

The process is generally less costly than other welding methods and eliminates the need for supplemental operations for machining, cleaning or otherwise modifying the weld junction. Frequently it is possible to eliminate entirely preparation treatments for the surfaces to be welded together and workpieces can be joined in this manner which are sensitive to other welding methods.

In spot-welding or resistance-welding systems, for example, two workpieces are pressed together between electrodes which conduct a current through the workpiece so that the junction is heated by ohmic current losses to form the bond. It is generally necessary, in such cases, to completely clean the surfaces in contact at the interface in a preparation treatment, from contaminants such as grease and even intrinsic metal oxides. The method is not suitable for thick workpieces and frequently causes a change in the metallic structure outwardly of the fusion bond.

Deposition-welding techniques, in which a weldment is supplied to the junction and the latter is heated by torch or electric arc, also have significant disadvantages. In such conventional weld systems, the weld joint may be irregular and thus can require an extensive afterwork, e.g. grinding, to remove excess material or irregularly deposited material.

Resistance welding techniques can eliminate the loss of this often expensive deposited material and the need for significant afterworking. Furthermore, resistance welding can be carried out with high quality machinery since the latter is not endangered by weld spatter or the fumes which may be present upon deposit welding.

Conventional deposit techniques, moreover, operate at temperatures in the region of the melting point of the metals of the workpieces so that there is always the possibility of damage of a structural or internal nature to the workpieces themselves. With friction-welding processes, however, high speeds at the contact interface and the rapidly generated friction heat destroys the oxide layers, breaks down any impurities, and drives the impurities and contaminants outwardly away from the bonding interface. As a result, almost perfect surface contact is brought about between the two workpieces in the bonding region between surfaces that are metallically clean and excluded from contact with the atmosphere. When pressure is then applied transversely to this interface, the surfaces bond together to form practically a defect-free lattice structure.

Friction welding thus requires two purely mechanical processes, namely, friction (brought about by rotation) and compression.

The parameters which are significant are thus friction time, friction force, compression time and compression force, i.e. all mechanical values which can be exactly reproducible, thereby affording the conditions for reproducible repetitive excellent welds with constant reliability.

Friction-welding machines are generally constructed to be able to withstand high loads in the sense of high momentum, speed and mass of the rotating parts and the ability of the machine and both the moving and stationary parts thereof to take up compression forces. In spite of the massive and robust nature of the machines, however, they are able to operate with precisions which cannot be approached by conventional welding processes.

While most friction-welding machines are designed for industrial applications and the mass production of welds in workpieces which are more or less similar, it is frequently desirable for special operations, experimental and test purposes, to provide an increase in the operating range, particularly in terms of the compression force, of the cylinder arrangement which is used.

While it has already been proposed to provide a tandem cylinder arrangement in which a number of cylinders are provided one behind the other, each having a piston acting on the next cylinder, to increase the operating range of a friction-welding machine, such systems have not found widespread use because they take up too much space. It has also been suggested to provide a fluid control system in which the working piston is subjected to counterpressure so that the effective working pressure can thereby be adjusted. Such arrangements are not satisfactory because they are complicated and difficult to handle, and are particularly sensitive.

OBJECTS OF THE INVENTION

It is the principal object of the present invention to provide a friction-welding machine of the aforedescribed type which is free from the disadvantages enumerated above.

Another object of my invention is to provide a friction-welding machine having a wider range of applications than earlier machines but which does not have the spatial requirement hitherto associated with increased operating range.

Still another object of this invention is to provide a friction-welding machine having a simple and space-conserving construction and yet a wide-operating range and versatility.

SUMMARY OF THE INVENTION

These objects and others which will become apparent hereinafter are attained, in accordance with the present invention, in a friction-welding machine of the type described, i.e. provided with means for holding a workpiece, means for rotating a second workpiece in contact with the first, and means for applying pressure transverse to the interface to cause bonding of the workpiece together at the latter. According to the invention, the last-mentioned means is a cylinder arrangement having a working piston received in a main cylinder and formed at its pressure-applying end with an auxiliary cylinder for an auxiliary piston.

According to a feature of the invention, the auxiliary cylinder is threaded into a bore of the main piston and the piston of the auxiliary cylinder bears via a pressure-applying member against the workpiece to be urged into contact with the other. When the device is to operate in the normal range of the main cylinder, the auxiliary cylinder is connected rigidly with the pressure-applying member.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
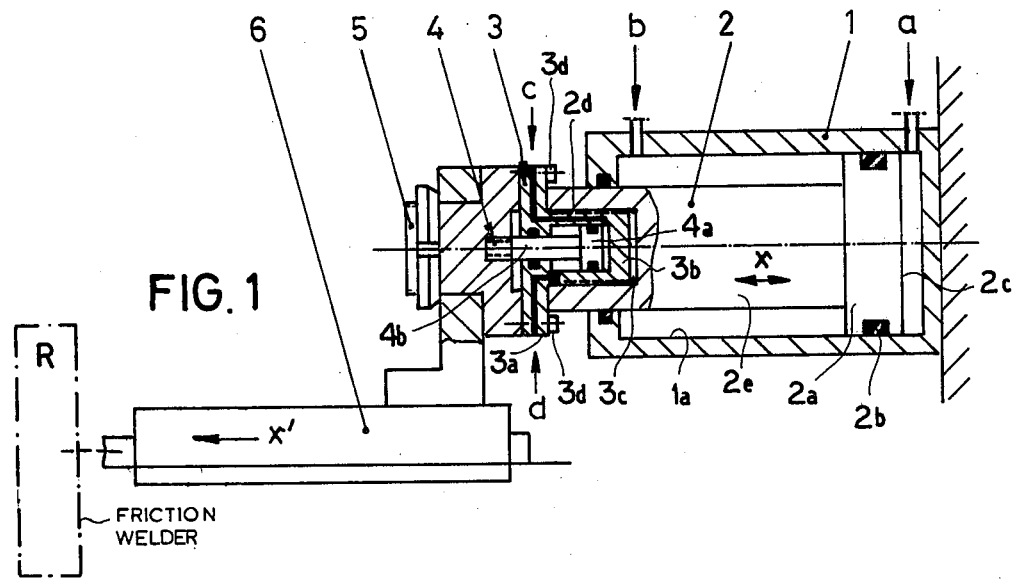
FIG. 1 is an elevational view of the portion of a friction-welding machine to which the invention pertains and shows the cylinder arrangement in axial section.

In FIG. 1 I have shown a stationary main cylinder 1 slidably receiving a main piston 2 having a large base 2a formed with a seal 2b running along the cylindrical wall 1a of the cylinder.

The cylinder has inlets a and b which can be selectively supplied with hydraulic fluid to displace the piston 2 to the left or to the right as represented by the arrow x, respectively.

The dimensioning of the area of the surface 2c and the maximum pressure which can be delivered to the cylinder, determine the maximum axial force which can be applied.

The minimum axial force, however, for the given area of the surface 2c is a function of the minimum available pressure determined by the pressure-relief or control valves of the hydraulic system. The cylinder can thus deliver a maximum force $F_M$ and is assigned a minimum force $F_m$, both being functions of the available pressure and the area of surface 2c.

When it is desired to increase the working range and thus the force differential between the values $F_m$ and $F_M$ with the main cylinder alone, it is found that this is not possible because the conditions establishing $F_M$ and $F_m$, including the area of surface 2c, cannot be changed without significant complication.

With the system of the invention, however, an auxiliary cylinder is interposed between the workpieces and the piston 2.

More specifically, the auxiliary cylinder 3 has a transverse flange 3a which is formed with a threaded boss 3b, the latter being screwed into a threaded bore 2d of the piston rod 2e of the working piston 2 at the pressure-applying end thereof.

The boss 3b defines a cylinder chamber 3c with which passages c and d communicate behind and ahead of the head 4a of a piston 4 which can be hydraulically displaced in the direction of the arrow x.

A pressure-applying member 5 can be coupled to this piston 4 or to the cylinder 3 directly and is affixed to a support 6 for the workpiece which is to be pressed against the other, generally the stationary workpiece. The pressure-applying member 5 is threaded onto the piston rod 4b of the piston 4.

The dimensioning of the auxiliary piston 3 is so selected that its force-development or working range runs directly up to the lower force limit $F_m$ or slightly overlaps the latter.

The flange 3a which is provided with the passages c and d also can abut the member 5 directly and can be connected to it via bolts 3d.

As long as the machine is to operate within the normal operating range of the main cylinder 1 and the main piston 2, the pressure-transmitting member 5 is bolted to member 3 and the cylinder 3 is not pressurized.

When the operating range is to be increased, the bolts 3d are removed and cylinder 3 can be hydraulically pressurized in the same operating program or sequence.

Figure 2:
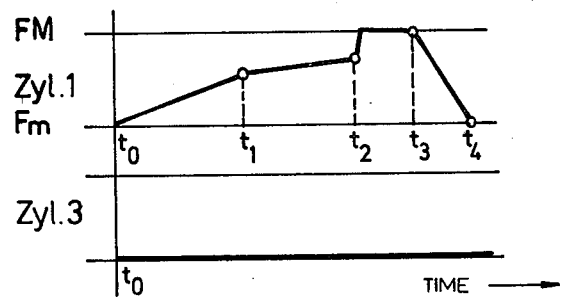
FIG. 2 is a timing diagram showing the operation of the main cylinder with the auxiliary cylinder ineffective, i.e. a timing diagram which corresponds to state of the art operation where no auxiliary cylinder is provided as in accordance with the invention.

FIG. 2 is a timing diagram showing the operation with the cylinder 3 locked out of an effective role. At time $t_0$, the cylinder 1 is pressurized and the piston 2 is shifted in the direction of the workpiece. At the point $t_1$, frictional rubbing commences between the two workpieces to be welded together and after the lapse of a predetermined period determined by the materials and the nature of the workpiece, the compression operation is commenced at time $t_2$. The compression step terminates at $t_3$ and the piston 2 is withdrawn in the opposite direction to $t_4$.

Obviously no pressure is applied to the cylinder 3 during this sequence.

Figure 3:
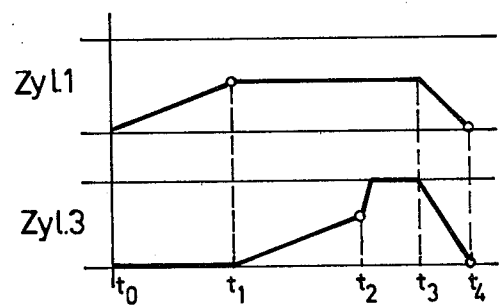
FIG. 3 is a timing diagram illustrating the operation when both cylinders are effective.

FIG. 3 shows a program in which both cylinders are effective. At time $t_0$, cylinder 1 is supplied with fluid and the piston thereof is moved toward the workpiece. No pressure is supplied to cylinder 3 and the piston 2 undergoes a play take-up stroke. At time $t_1$, when friction contact is established and one workpiece rotated against the other, the piston 2 is held in place and the pressure is built up in cylinder 3 to urge the workpieces together while they are rotating. At point $t_2$, the pressure is sharply increased in cylinder 3, thereby pressing the workpieces together firmly to effect the bond, the compression stage continuing until $t_3$ at which point welding ends and both cylinders are relieved and the pistons withdrawn to the starting points at $t_4$.

From the diagram of FIG. 3 it will be apparent that the operating range of the machine has been markedly increased with the present invention since in the region between $t_1$ and $t_3$ the friction and compression phases of the auxiliary cylinder are superimposed upon the displacement phase of the main cylinder.

In the drawing, the block R represents the conventional parts of the resistance welding machine including the clamps for the two workpieces, the rotary drive and any other equipment which may be conventionally associated therewith (see pp 132ff, THE WAY THINGS WORK, vol. 2, Simon and Schuster, NY, 1971).

I claim:

1. In a friction welding machine of the type wherein a cylinder arrangement presses a workpiece against another workpiece upon relative rotation of the workpieces in contact at a common interface to bond said workpieces together, the improvement wherein said cylinder arrangement comprises a main cylinder, a main piston displaceable in said main cylinder and having a force-applying end, said force-applying end being formed directly with an auxiliary cylinder isolated from said main cylinder and externally thereof, an auxiliary piston shiftable in said auxiliary cylinder, and pressure-transmitting means for applying force of said main piston and of said auxiliary piston to one of said workpieces transversely to said interface, said cylinders being provided with independently chargeable fluid-inlet ports to each side of the respective piston, said end of said main piston being provided with an internally threaded bore, said auxiliary cylinder being threaded into said bore and having a flange transverse to said pistons and disposed outside said bore, and means for selectively securing said flange to said pressure-transmitting means.

2. The improvement defined in claim 1 wherein said pressure-transmitting means includes a member and securing means includes bolts fixing said flange to said member.

3. The improvement defined in claim 2 wherein said auxiliary piston is threaded to said member.

* * * * *